(12) United States Patent
Boehm

(10) Patent No.: US 7,451,146 B2
(45) Date of Patent: Nov. 11, 2008

(54) ALMOST NON-BLOCKING LINKED STACK IMPLEMENTATION

(75) Inventor: Hans-Juergen K. H. Boehm, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 655 days.

(21) Appl. No.: 10/883,118

(22) Filed: Jun. 30, 2004

(65) Prior Publication Data

US 2006/0005191 A1 Jan. 5, 2006

(51) Int. Cl.
G06F 7/00 (2006.01)
G06F 17/30 (2006.01)
G11C 29/00 (2006.01)
G01R 31/28 (2006.01)
G06F 17/00 (2006.01)

(52) U.S. Cl. .................. 707/8; 712/9; 710/20; 710/21; 714/11; 718/106

(58) Field of Classification Search ....................... 707/8
See application file for complete search history.

(56) References Cited

U.S. PATENT DOCUMENTS

| | | | | | |
|---|---|---|---|---|---|
| 5,111,411 | A | * | 5/1992 | Browne | 382/141 |
| 5,295,262 | A | * | 3/1994 | Seigh, II | 707/8 |
| 5,867,649 | A | * | 2/1999 | Larson | 709/201 |
| 5,867,660 | A | * | 2/1999 | Schmidt et al. | 709/227 |
| 5,924,098 | A | * | 7/1999 | Kluge | 707/100 |
| 6,173,373 | B1 | * | 1/2001 | Bonola | 711/147 |
| 6,178,473 | B1 | * | 1/2001 | Bonola | 710/54 |
| 6,374,286 | B1 | * | 4/2002 | Gee et al. | 718/108 |
| 6,826,757 | B2 | * | 11/2004 | Steele et al. | 719/314 |
| 7,017,160 | B2 | * | 3/2006 | Martin et al. | 719/315 |
| 7,111,293 | B1 | * | 9/2006 | Hersh et al. | 718/100 |
| 7,117,502 | B1 | * | 10/2006 | Harris | 719/315 |
| 7,194,495 | B2 | * | 3/2007 | Moir et al. | 707/206 |
| 7,254,597 | B2 | * | 8/2007 | Moir et al. | 707/206 |
| 7,299,242 | B2 | * | 11/2007 | Moir et al. | 707/103 Z |
| 7,389,291 | B1 | * | 6/2008 | Shavit et al. | 707/8 |
| 2003/0140085 | A1 | * | 7/2003 | Moir et al. | 709/107 |

(Continued)

OTHER PUBLICATIONS

Boehm, "An Almost Non-Blocking Stack", Jun. 25, 2004, HP Labs Technical Reports, Hewlett-Packard Development Company, HPL-2004-105.*

(Continued)

*Primary Examiner*—Tim Vo
*Assistant Examiner*—Joseph D Wong

(57) ABSTRACT

A method and computer system for implementing, in a multithreaded environment, an almost non-blocking linked list allow a lock-free access provided that certain conditions are met. The approach involves: associating a pointer and an auxiliary data structure with each linked list, using a compare-and-swap (CAS) operation, and making a slight modification of values associated with nodes under certain conditions. The CAS operation guards against setting the pointers incorrectly during insertion and removal operations. The auxiliary data structure, also referred to as the 'black list,' holds a dynamic list of values, typically pointer values, associated with nodes that are in the process of being removed by a thread.

24 Claims, 5 Drawing Sheets

U.S. PATENT DOCUMENTS

2003/0174572 A1* 9/2003 Moir et al. ............. 365/230.03
2003/0182462 A1* 9/2003 Moir et al. ................. 709/310
2003/0182465 A1* 9/2003 Moir et al. ................. 709/314
2004/0165610 A1* 8/2004 Chasin ....................... 370/428
2005/0071335 A1* 3/2005 Kadatch ........................ 707/8

OTHER PUBLICATIONS

OED.com, Oxford English Dictionary Online, Entry for "almost", Dec. 31, 1989, 2nd Ed.*

Boehm, "An Almost Non-Blocking Stack", Jul. 25, 2004, PODC'04, ACM Press, p. 40-49.*

* cited by examiner

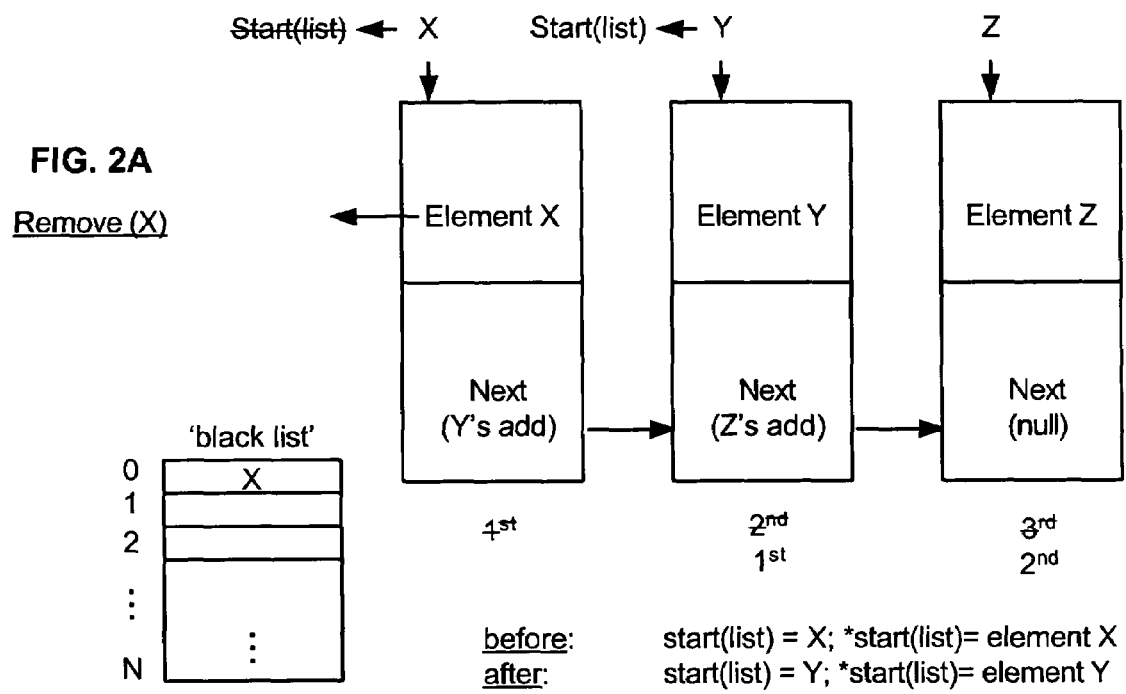

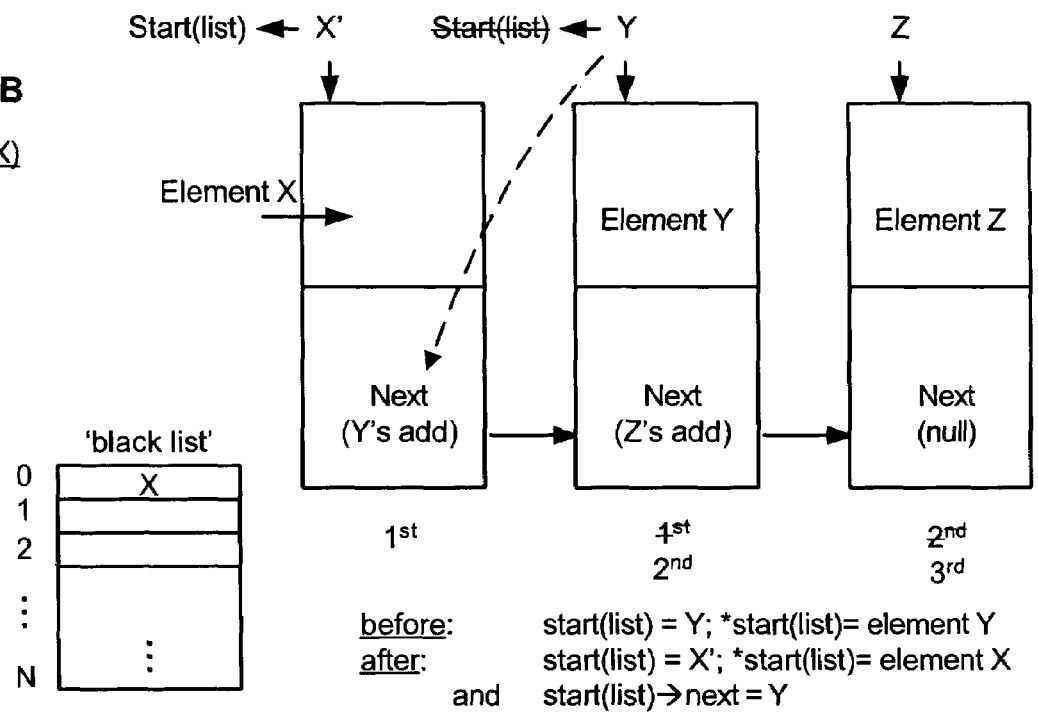

ALMOST NON-BLOCKING LINKED STACK IMPLEMENTATION

FIELD OF THE INVENTION

The present invention is related to the management of shared resources in a computer system and, more particularly, to achieving acceptable multithreaded system performance with a resource sharing scheme.

BACKGROUND

One of the performance benchmarks of computer systems is process response time which depends, in large part, on the manner in which the process handles resources. In a computer system, a process includes two components, a thread and one or more resources. A thread is a dynamic object representing a control point in the process and executing a sequence of instructions. Multithreaded systems allow more than one thread in each process, and the threads typically have shared resources, i.e., a common address space or shared variables. The threads are instantiated as system-level threads or application level, also known as user-level, threads. The system-level threads schedule an underlying user-level process when an application is executing that, in turn, utilizes library functions to schedule its threads. Hence, the implementation of user-level threads includes the use of libraries that provide the functionality for creating, synchronizing, scheduling and managing threads.

A stack is a LIFO (Last-in-First-Out) data structure, and is often implemented as a linked-list (hence the term linked stack). A LIFO is a kind of data structure which only allows element insertion and removal and where the last element inserted is the first element removed. A basic linked list is one in which a node includes an element and a pointer to the next element. A LIFO Linked list is a linked list data structure that allows element insertion and removal at the front of the list where the last element inserted is the first element removed. An element X1 is inserted by creating the first node (X1, next), and a utility entry pointer is attached to the new node and then the contents of the utility entry pointer is assigned to the entry pointer. As shown in FIG. 1, the entry pointer 12 points to the beginning of the linked list (and the first element 14a), the next pointer 14b points to the second element 16b, and the next pointer in the last node 22b is null.

In a multithreaded system, each thread has its own private objects as well as program counter and its own local state information. Multithreading allows concurrency, although if any shared resource can be accessed concurrently by multiple threads, such access must be synchronized. Accordingly, as the aforementioned libraries provide synchronization objects, applications can provide concurrency of user-level threads by scheduling and managing the user threads through these libraries. When multiple threads run concurrently, the synchronization objects protect shared resources by employing a blocking technique. And so the synchronization objects include a lock variable and often a queue of blocked threads (the threads being blocked while control is with another non-blocked thread). The blocking scheme isolates or locks part or all of the resource (e.g., data structure) to prevent interference from other threads. However, a deadlock may occur if a thread fails or is halted.

Consequently, non-blocking techniques are often used to outperform conventional blocking techniques. With non-blocking techniques the resource is always accessible to the threads, guaranteeing that at least one of the threads will complete its operations in a finite number of steps whether or not other threads have failed or are halted. Generally, non-blocking techniques require a universal atomic primitive such as 'compare-and-swap' that supports, for example, insertion and removal of elements from a data structure. Atomicity implies that concurrent threads are protected from accessing preliminary data and any change made during the operation is revoked if anything goes wrong with the operation; although the operation can be retried or it returns an error code. Atomic operations either return a specified result or no result at all but will not change any data structure or parameter in an unpredictable way, and in a multithreaded environment atomic operations will not return a partially updated or intermediate value.

The 'Compare-and-swap' operation is a synchronization primitive that can resolve in a wait-free fashion a finite number of contending threads. Because of this property compare-and-swap is used to implement wait-free schemes that do not use locks; and it is often used for synchronization and memory updates by concurrent threads. Compare-and-swap, also known as 'CAS', is a three-operand atomic instruction of the form CAS (S, O, C), where O, C, and S are word variables (or possibly other variable types). S is the shared variable, O is usually a private copy of the 'old' value of S, which is made sometime earlier by the thread, and C is the new value to which the value of S attempts to change via the CAS operation (i.e., updating S by replacing S' old value with C). The operation is allowed to do so only if S still (or again) has value O. If the attempt succeeds the operation returns a Boolean value 'TRUE.' If the attempt fails, the operation returns the Boolean value FALSE. The CAS operation can be outlined as follows:

```
old = shared;
Boolean CAS (shared, old, new)
    if (shared = =old)
        shared = new;
        return TRUE;
    else
        return FALSE;
    end.
```

Notably, the update of S (shared) may be inconsistent as a result of the 'A-B-A' problem. The inconsistent update of shared occurs if in the time between making the private copy and the attempt to update shared, intervening threads modify shared to another value and then modify it back to the old value. Assume for example that shared's old value is A and the CAS operation is intended to update it to C. Then, if during the time between making the private copy of A (old) and the attempt to update share from A to C, other threads modify share from A to B and back to A, the comparison (shared==A) will succeed and the CAS operation will allow the update even though there was an intervening change to the data structure, and other information examined since share was copied may have changed (hence the term 'A-B-A' problem).

SUMMARY

The present invention addresses implementation of shared resources in view of the foregoing A-B-A problem by providing an almost-non-blocking implementation of a data structure such as a linked stack. In particular, a system and method for almost non-blocking linked stack implementation according to the principles of the present invention relies on the compare-and-swap (CAS) primitive to allow at least one thread trying to access the data structure to make progress, even if other threads are delayed indefinitely. The typical implementation relies on a single-word compare-and-swap (CAS) primitive. This is an efficient method for implementing with stack operations a linked list of pre-allocated objects that can be concurrently accessed from multiple threads. The implementation of a linked stack according to the foregoing is non-blocking unless more than a predetermined number, N (e.g., 2, 3, 4, 7 or 8), of threads are concurrently trying to remove an element at the top of the linked stack. Hence we refer to it as "almost non-blocking".

Essentially, the proposed paradigm includes, in conjunction with the CAS primitive, a pointer and a 'black list'—i.e., a relatively small array or other data structure—to which the removal operation adds (via CAS) a value associated with each element that is currently in the process of being removed from the data structure. If an insertion operation notices that the element being inserted is in the black list, which means that another thread is in the process of removing that element, the insertion operation modifies that element slightly and inserts the modified element instead. Preferably, this modification is accomplished by altering the low-order address bits (adding 'noise' that does not affect the word or other addressing boundaries scheme).

Thus, according with the purpose of the present invention, a method and computer system are provided for implementing, in a multithreaded environment, an almost non-blocking linked list allowing a lock-free access provided that certain conditions as mentioned above are met. The computer system includes: a processor and a memory the space in which is being allocated for computer program code, a first pointer, a linked list to which the first pointer is pointing, and a black list associated with the linked list. The black list contains one or more slots, each slot for holding a value associated with a node that is in the process of being removed from the linked list.

The program code has instructions that cause the processor to perform the method steps including: providing a first pointer associated with a linked list, the first pointer pointing to the front of the linked list; providing a black list associated with the linked list and containing one or more slots, each slot for holding a value associated with a node that is in the process of being removed from the linked list; modifying the value associate with a node if a thread attempts insertion of the node to the linked list but the value is found in the black list, the value being held in the black list for as long as removal of the node is ongoing, wherein the first pointer receives the value only if it is not in the black list, otherwise the first pointer receives the modified value provided, however, that the modified value is also not found in the black list; if the modified value is also found in the black list, repeating the modifying step until, lastly, the modified value is no longer found in the black list; and using a compare-and-swap (CAS) operation in each insertion, and removal, to determine if an intervening thread has modified the first pointer after a copy of the first pointer has been made but before it is to receive the value or modified value, whereby access to the linked list by multiple concurrent threads is almost non-blocking.

Comparatively speaking, while the almost non-blocking implementation according to this invention can rely on a single-word CAS, the conventional full non-blocking implementations rely on at least double-word CAS or similar operations, or they are size bounded, or do not allow immediate reuse of memory objects, or are considerably more complex and slower than the almost non-blocking implementation proposed. These and other features, aspects and advantages of the present invention will become better understood from the description herein, appended claims, and accompanying drawings as hereafter described.

BRIEF DESCRIPTION OF THE DRAWINGS

The accompanying drawings which, are incorporated in and constitute a part of this specification, illustrate several embodiments of the invention and together with the description, serve to explain the principles of the invention. Wherever convenient, the same reference numbers will be used throughout the drawings to refer to the same or like elements.

FIGS. 2A and 2B respectively show an implementation of the almost non-blocking linked list data structure with the first pointer, start(list), before and after removal/insertion, and the associated black list.

DETAILED DESCRIPTION

The present invention is implemented in a multithreaded programming environment, and in the preferred instance it is used to provide almost non-blocking access of shared data from multiple threads. The present invention can be used to implement various shared data structures, including a stack, accessible from multiple concurrent threads.

An embodiment of the present invention is provided as a library function, or operating system function, that can be called during execution of the program; and it would be run as part of the program execution. Alternatively, the function can be embodied in the application code itself, either as a module that is linked in the executable file after compilation or as routines within a module. More often that not, however, it would be implemented as a library file or invoked with a library function call or set of function calls.

Consider for example the context of user-level signals as one scenario in which the present invention provides a meaningful solution. In the context of user-level signals, conventional locking doesn't work very well because of potential deadlocks. In this context, timer signals, used for example in profiling multi-threaded programs, prompt signal handlers to update shared data. In executing one such multithreaded program, multiple threads can invoke the same signal handler, each based on its own individual timer signal. Each time it is invoked the signal handler, in turn, attempts to access the same stack (i.e., insert or remove data on the same stack) which is typically in the form of a linked stack (LIFO linked list data structure). The reentrant signal handler can thus create conflicts in the linked stack updates.

It is known that with non-blocking techniques the resource is always accessible to the threads, guaranteeing that at least one of the threads will complete its operations in a finite number of steps whether or not other threads have failed or are halted. However, since non-blocking techniques require the universal atomic primitive of 'compare-and-swap' to support insertion and removal of elements from the stack, they either require complex solutions to the aforementioned A-B-A problem or require a more general version of the compare-and-swap operation.

In view of the A-B-A problem, the proposed almost non-blocking approach provides a method and system for implementing, with stack operations, a linked list of pre-allocated objects (or linked stack) that can be accessed from multiple concurrent threads. The present 'almost non-blocking' approach can be used to create data structures such as, for example, work lists for parallel algorithms or memory allocation algorithms that can be safely called from a signal or interrupt handler with only minor restrictions on the structure of the code that uses it.

Figure 1:
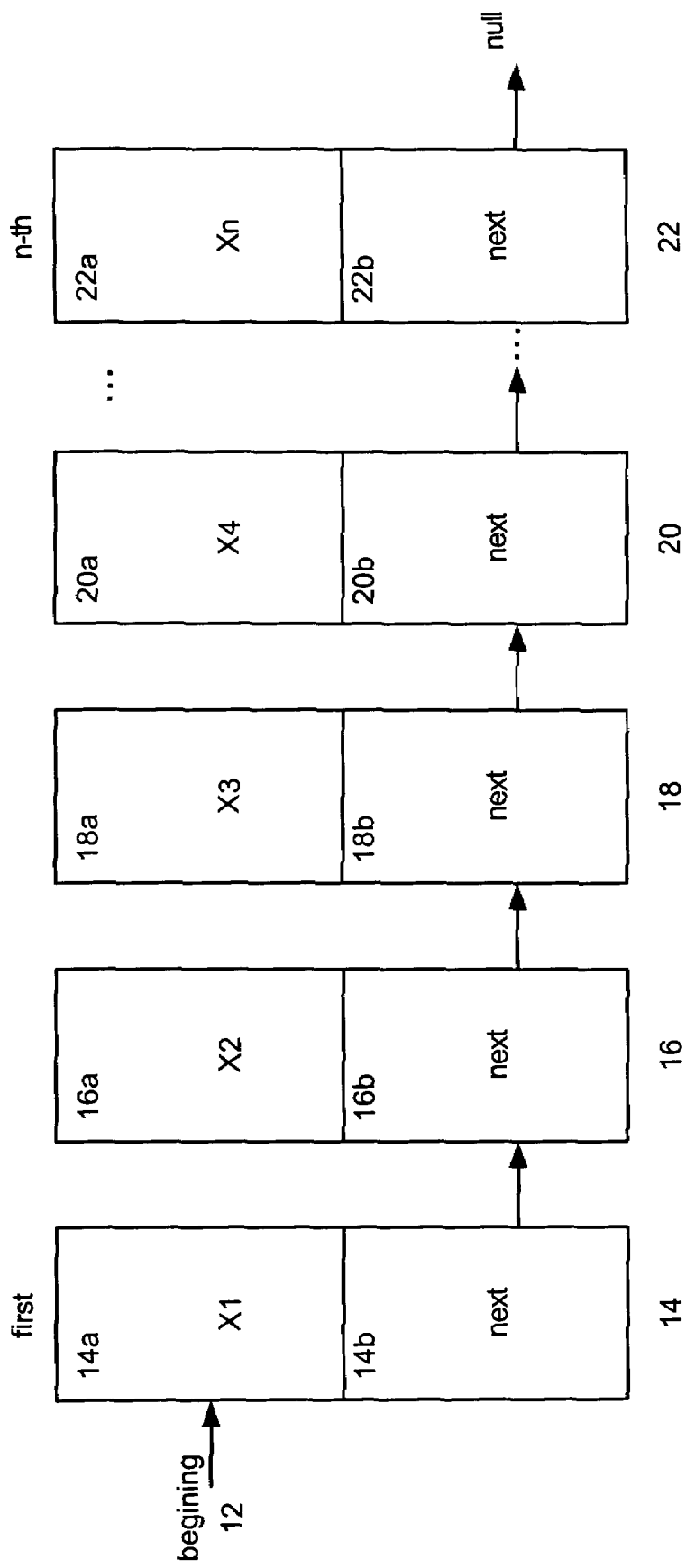
FIG. 1 illustrates a basic linked list.

As mentioned these types of data structures allow insertion and removal of elements. More precisely, linked lists allow insertion and removal of nodes where, in general, each node includes an element and a pointer to the next element or to 'null' if it is the last element in the linked list (see: FIG. 1). For the most part, the present approach is lock-free; and it remains so provided that the number of threads performing the remove operation does not exceed a predetermined limit, say, N. If it does exceed N, further removals will be blocked until a remove operation completes. Namely, the implementation is almost non-blocking in that at least one thread will be able to access the linked list regardless of the state of the other threads provided that the number of threads simultaneously removing elements from a list is limited by N. So, when using the present approach to implement, for example, signal handlers in a single-threaded program, it requires that the number of simultaneous attempts to access the data structure from a signal handler be bounded by N (where N is, say, 3, 4, 7 or 8, and each attempt is, in fact, a re-entry of the handler). However, the almost non-blocking linked stack implementation outperforms non-blocking implementations, even though non-blocking linked stack implementations can be used in these applications, and it finds no approach that appears to be equally as practical to implement.

In general, this approach involves: associating a pointer and an auxiliary data structure (e.g., array) with each linked stack, using a compare-and-swap (CAS) operation, preferably a single-word CAS operation, and making a slight modification of values associated with nodes under certain conditions. The CAS operation guards against setting the pointers incorrectly during insertion and removal operations. The auxiliary data structure, also referred to as the 'black list,' holds a dynamic list of pointer values, associated with nodes that are in the process of being removed by a thread.

Preferably, pointer values get black-listed at the beginning of a node removal process. The purpose of the black list is to prohibit a thread from inserting to the linked list a node for which a different thread is still attempting removal. (This may happen, for example, if the removing thread is suspended while another thread both removes and then reinserts the list node.) Stated another way, a node being removed cannot be re-instated to the linked list at the same time that it is being removed. The black list is examined by the insertion operation to determine if the value associated with the node is present in it and, if so, being that the element is in the process of being removed, a slightly modified value associated with the element is inserted in the linked list instead.

Note that in a multiprocessing, multithreaded environment there can be thousands of linked lists, and a black list is allocated to each of them (although many of the black lists may be empty). Alternatively, a black list is allocated to a group of linked lists.

FIGS. 2A and 2B illustrate in general terms the linked list, its associated auxiliary data structure (black list) and pointer, and their respective contents upon insertion and removal of node X, with pointer to 'element X', in accordance with the foregoing. Considering that we treat the linked list as a LIFO, it allows element insertion and removal at the front of the list where the last element inserted is the first element removed. Note that the linked stack is viewed as having the form of a LIFO linked list and therefore the principles of the present invention apply equally to the LIFO linked list (or simply linked list) and linked stack. And, although these terms may be used interchangeably throughout this discussion (a linked list) or LIFO linked list, is typically considered more broadly than linked stack.

To add a new (first) node into the list, dynamic memory allocation is used to create space for the node, or an existing node is reused. The first pointer is made to refer to the first node (first, next) or, alternatively, a utility entry pointer is attached to the new node and then the contents of the utility entry pointer is assigned to the first pointer. In the example here, we refer to the first pointer associated with a given linked list as $first_{13}$ ptr, which points to the front of the linked list.

Before proceeding further, it is worth mentioning that the discussion herein includes recitations of various program code sections with instructions for performing various aspects of the almost non-blocking shared source implementation. It is important to make clear, however, that the instructions presented herein above and below are merely exemplary and do not represent the only implementation possible. Also, to familiarize the reader, it is worth introducing a number of program mechanisms and operators and their usage in the context of program code (such as C or C++ program code).

For example, a pointer is a program mechanism employed to access an object indirectly. An instance of a pointer name in a program is replaced in execution by the pointer's value (an address). In order to indicate, in C or C++ programs, a reference to an object pointed to by the value, a unary operator "*" is used. Namely, the value of the expression *first_ptr is the value of the object addressed by the value of the first_ptr (which in the linked list example is the value of the first list node). Similarly, an i-th element in an array of elements named 'black_list' can be represented by the expression black_list[i]. In C and C++ programs, the value assigned to an array name is the address of the first element of the array (the same applies to the list or linked list). The array's first element black_list[0] has the same value as *black_list (and, in a similar fashion, the first_pointer refers to *list or its equivalent list[0]). Another relevant type of data structure in C and C++ programs, is the 'structure' type. A structure is a collection of objects that are related in some way, although they themselves may be of different types. Each object is a 'member' of the structure, and it has its own identifier separate from the structure identifier. The "•"operator functions to separate between the reference to the entire structure and the specific reference to its member such that a member can be referenced by structure•member. If 'pointer' points to the structure, *pointer refers to that structure itself. And, if a member of a structure is itself an array type, some inner addressing occurs to derive a value of an element in that array (e.g., structure•member[i]). The "→" operator is also used for referring to an object of the structure, and if 'pointer' points to the structure, both pointer→member and (*pointer)•member refer to 'member' in a similar way. Finally, typecasting is used to covert one data type to another (e.g., "(INT *)" coverts pointer to integer); and assignments are used to assign a value to data (e.g., i=0). Note that (INT *) is a fictitious function name chosen to represent a typecasting operation or a function for converting the pointer value to its respective integer value. This particular conversion is, for the most part, semantic in nature and it does not change the actual number used to represent the value.

After this introduction the discussion can now return to the example in FIG. 2A. As shown, before node X is removed the first pointer points to node X, the first element in the linked list, i.e., 'first_ptr=X. Assuming that Node X is a structure, it has two members, the 'element' X (the actual data) and a 'next' pointer which points to element Y, the second node in the linked list, i.e., X→next=Y. Node Y is a structure with its member 'next' pointer pointing to element Z, the third element in the linked list, i.e., Y→next=Z. In turn, node Z has a 'next' member with a value set to 'null', node Z being the last element in the linked list, i.e. Z→next='null'. As can be understood from the foregoing introduction, the node identifiers X, Y, and Z are analogous to pointer to node X, pointer to node Y, and pointer to node Z, respectively. Incidentally, assuming that nodes X, Y, and Z are structures with element X, element Y, and element Z as their respective first members, the values of X, Y, and Z are the addresses of nodes X, Y, and Z, respectively, as well as their first members. Note also that in this context, a node becomes an element of the linked list if it is inserted to the linked list, and it becomes independent of the linked list when it is removed from it.

Once node X is designated for removal by a thread, a value of X is placed in the black list. Preferably the value associated with pointer X is its integer value, i.e., (INT *)X. The attempt to remove node X is made using the compare-and-swap (CAS) operation, as will be later explained in more details.

Importantly, by replacing X in the first_ptr with another pointer value the connection between node X and the linked list is cut off effectively removing node X from the linked list. Thus, if examination of the first pointer indicates that the pointer to node X is no longer there (i.e., X has been successfully removed from the linked list and the first pointer is no longer the pointer to node X) the value of the pointer to node X is removed from the black list.

After node X is removed from the linked list, node Y and its member next pointer move to the front of the linked list. Consequently, the first pointer first_ptr now points to node Y, i.e., first_ptr=Y. Since node Y is now at the head of the linked list, node Z becomes the second element. And, although the first_ptr pointer changed from X to Y, the 'next' pointers associated with Y and Z, respectively, remain unchanged.

Assuming next that while element X is being removed by one thread, another thread overtakes it, removes X, and is then attempting to reinsert the same element X. In this case however, a value associated with the pointer to X is in the black list (i.e., the integer value of the pointer X). Upon detecting this value in the black list, in order to prevent blocking the insertion of node X, the insertion operation modifies the value associated with the pointer to node X. Namely, the modified value of the pointer is inserted instead. The modification is slight and it is said to be in the 'noise' level without otherwise perturbing the machine addressing operations. For example, addressing aligned at word (32 bits) or double-word (64-bits) boundaries does not use the two least significant address bits, and in some architectures they are always set to zero. Accordingly, to avoid affecting the word or double-word address boundaries only the two least significant bits of the pointer to X are tweaked. These bits can be masked off (to zero) before the pointer is used again. With the modification differentiating between the removed X element and the inserted X element, the insertion into the linked list can proceed. Upon insertion, node X goes to the head of the linked list and becomes it first element. The first pointer, first_ptr, now takes the tweaked value, so that first_ptr=X', and the next pointer associated with X now takes the value of Y's pointer. Assuming that the node X is a structure with members 'element' and 'next', and X→next=Y. Node Y becomes the second element pointing to node Z which is now the third element in the linked list (still pointing to 'null').

Note that the number of threads that can gain lock-free access to the stack is limited by the number of positions, N, available on the black list. Namely, if the number of threads that attempt to remove an element exceeds N, i.e., the black list is full, the stack is temporarily blocked until one of the slots in the black list is emptied (i.e., the removal operation is waiting in a loop until one of the black list slots is free to accept a new value). This tends to require a longer black list. However, since the insertion operation must examine, sequentially, each of the black list positions to see if it includes a pointer value for the inserted item, it tends to require a shorter black list so as to save time. Therefore, there needs to be a balance between the two requirements and the resulting size, N, of the black list is one which supports a reasonable compromise between them, e.g., N=2, 3, 4, 7 or 8.

To be sure, there is a need to guard against potential inconsistencies arising from the A-B-A problem which may set the pointers incorrectly. Therefore to show how the A-B-A problem is avoided the foregoing operations are treated with more details in the explanation below. The removal operation is illustrated in the flow diagram of FIG. 3, and the insertion operation is illustrated in the flow diagram of FIG. 4.

Figure 3:
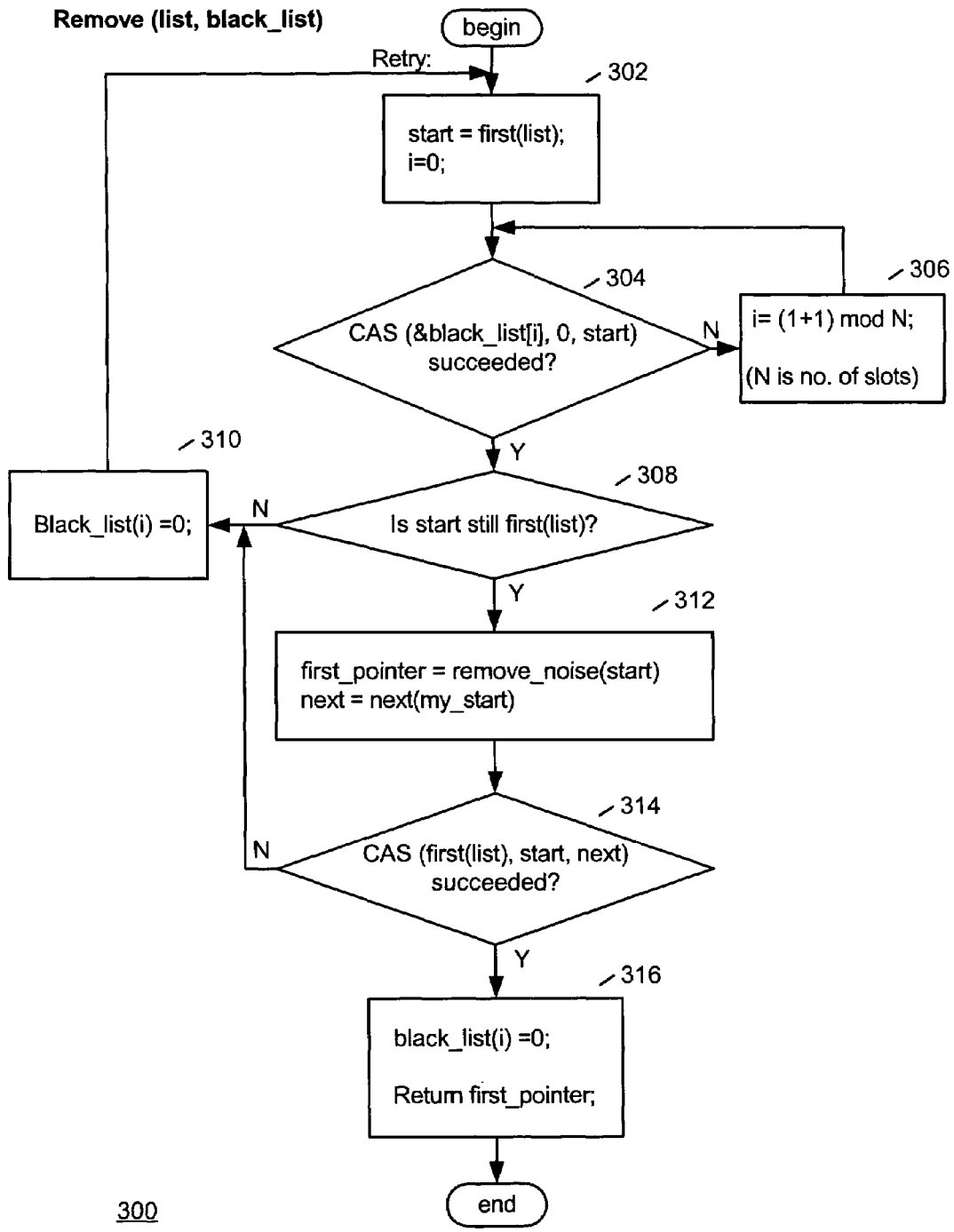
FIG. 3 illustrates the flow diagram of a exemplary removal operation—Remove function.

The removal operation shown in the diagram of FIG. 3 is presented in this instance as a function that receives two arguments, list and black-list, and it is declared as:

Entry * Remove (list, black_list); where 'Remove' is the function name and 'Entry *' represents the return value of the function (which happens to be a pointer value). The parameter list is a pointer to the variable pointing to the start of the list, i.e. &first_ptr. The remove function begins at 302 with an assignment value of the first pointer indicating the beginning of the linked list, i.e., first(list) to the pointer 'start', as well as an assignment of 0 to the index 'i'—that is, Retry:
start=*list; and
i=0;
where 'i' is and integer representing an index to the i-th slot of the black list (the first slot is at location 0, the N-th slot is at location N−1, and so on).

One detail which is not shown in the diagram is a test that the Remove function performs on the pointer 'start' to determine if the list is empty, i.e., if (0=start) return 0;

Then, if the list is not empty, the value of the pointer 'start' is placed in the i-th slot on the black list provided certain conditions are met 304. As explained before, this may have to wait a while if the black list is full. Assuming that the black list has N slots, a loop for placing the value of 'start' commences with examination of the first slot in the black list followed by examination of the other slots sequentially to find an empty slot (304 and 306). The reason for the loop is the need to repeat certain instructions as the black list is being traversed. The loop 304 is exited once a slot is found and the placement of the pointer value is allowed. An exemplary loop for placement of the value of 'start' can be outlined as follows:

```
for (i=0; i=(i==N−1? 0: i+1))
    if (a→black-list[i]=0 && CAS((INT *)(black-list+i), 0, (INT)start))
    break;
```

Namely, the 'for' loop examines the i-th slot with i=0 in the first place and i being incremented by 1 (i=i+1) for each successive slot. If i reaches N−1, it means that the black list is full and we have to start over with i again set to 0 (i=N−1?0 . . .) and look to see if meanwhile a slot became empty. An i-th slot is empty if black-list[i]==0. Again, '(INT)' is an operation performing, in this example, a conversion of pointer type to integer type, or other suitable function. The label 'INT' is merely exemplary and not intended to restrict the atomic operation to a particular function or argument type.

The compare-and-swap (CAS) primitive receives three arguments: (INT *)(black-list+i), 0, and (INT)start, where the (black-list+i), is the shared data structure (the i-th slot), 0 is the old value against which the contents of i-th slot is compared, and (INT)start is the new value (value of the first pointer pointing to the first element of linked list). It is possible that in the interim another thread inserted a value to the i-th slot where it is no longer empty (!=0). Thus, if the shared data structure contains the old value, i.e., the i-th slot is empty and equal to 0, the CAS replaces the 0 with the new value. Stated another way, if the CAS succeeds, it places the first pointer value in the i-th slot of the black list (such that this slot is no longer empty holding this value for as long as the removal is ongoing). As noted, success means that the loop can now break (304 ends).

After the value of the first pointer is successfully inserted in the black list, indicating that the element it points to is in the process of being removed, the 'start' variable is examined to see that it was not changes in the interim by another thread 308. That is, the Remover function determines if the 'start' variable is still equal to start(list), and if it was changed the Remove function empties the i-th slot 310 and goes back to the beginning (to step 302) and starts over. This can be outlined with the following instructions:

```
If (start != *list) {
    black-list[i] = 0;    /* store 0 in the -ith slot*/
    goto Retry;    /* see above */
}
```

Assuming then that the 'start' pointer value has not been disturbed by an intervening thread, the Remove function proceeds to assign to *list ('first_ptr' in FIG. 1) the pointer to the second list entry 312, 314. That is, the value of the pointer to the first element of the linked list (which is targeted for removal) is assigned to my_start and, in addition any 'noise' is masked off from the least significant bits of the first_ptr value. Then, the 'next' pointer is assigned the value of next, the member of first_ptr. This can be outlined with the following instructions:

```
my_start =remove_noise(start);
next = my_start→next;
``` where 'next' receives the value of next the member of my_start and, eventually, 'next' becomes the first pointer (pointing to the new first element of the linked list after the Removal is complete).

Indeed, the Remove function next performs another CAS operation that, if successful, will place next in the location referenced by list 314. In this instance, the CAS primitive receives a new set of three arguments: list, start, and next, where list points to the shared entity, start is the old value to be compared against the value of the shared entity and (as indicated above) 'next' is the new first pointer that will replace the value of the shared entity if the CAS operation succeeds 314. If the CAS operation succeeds, the Remove function returns the value of my_start 316; otherwise, if it fails, the Remove function goes back to start over again (at 302).

Again, as can be understood, if the value referenced by list was changed in the interim by another thread it will no longer be equal to the integer value of *list and, in that case, the CAS will fail. If, on the other hand, the integer value of *list' has not changed, the CAS succeeds and it allows 'next' to replace the old value in *list so that afterwards *(list=next.

In either case, whether the CAS operation succeeds or not, the i-th slot of the black list is emptied making room for another removed element. Namely, the i-th slot of black list is zeroed out (via 316 or 310, respectively). The forgoing can outlines with the following instructions:

```
If (!CAS ((INT *) list, (INT)start, (INT)next)) {
    black_list [i] = 0;
    goto Retry;
}
black_list [i] = 0;
return my_start;
```

At the end of the Remove procedure, assuming success of the CAS operations and removal of the first element from the front of the, the *list pointer will now point to the formerly second, now new first element, of the linked list. The remainder of the linked list is preserved. As indicated before, the result of a Remove operation is illustrated in FIG. 2A.

Figure 4:
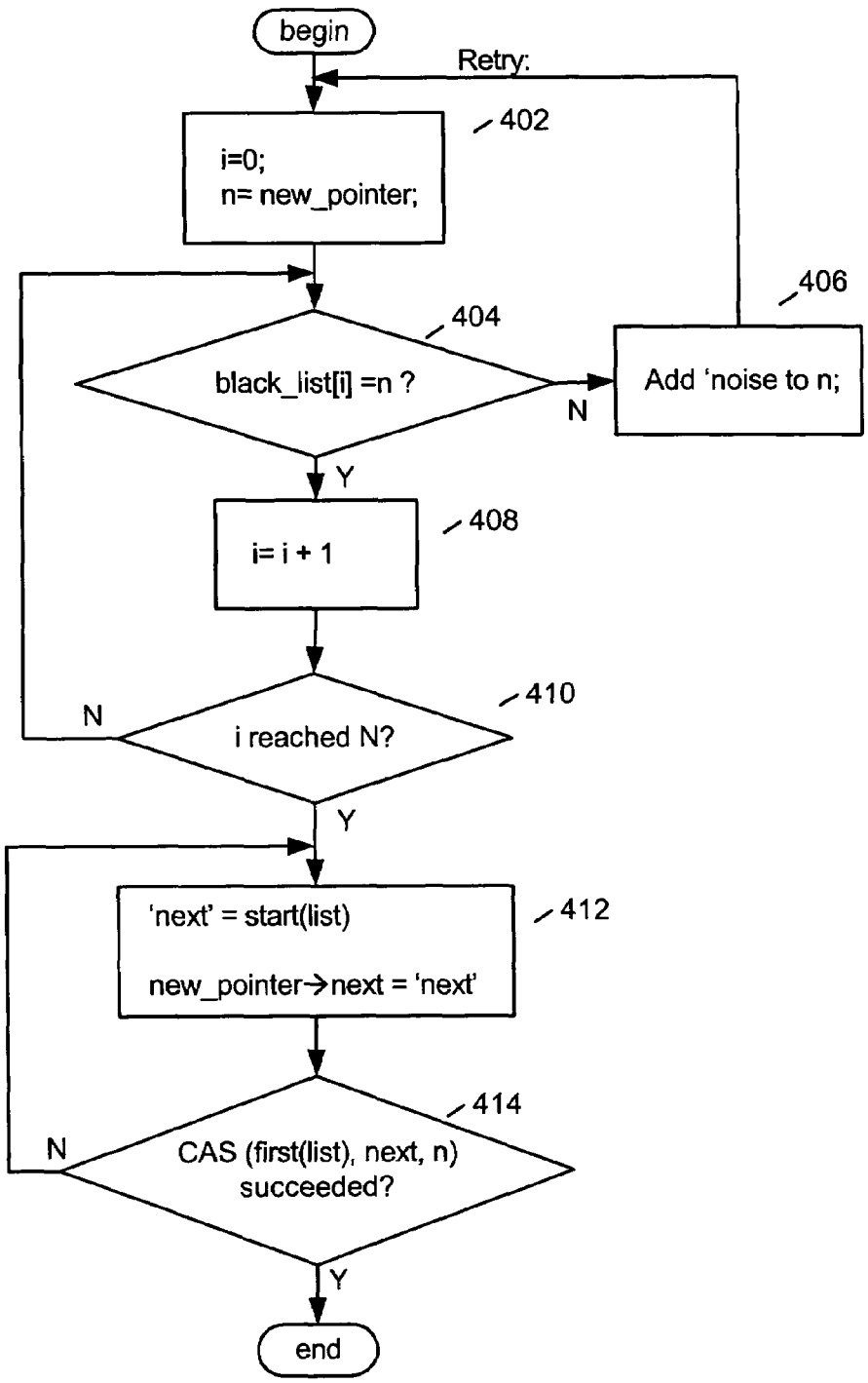
FIG. 4 illustrates the flow diagram of an exemplary insertion operation—Insert function.

Next we consider the Insert function an example of which is shown in FIG. 4. Assuming that new_pointer is the pointer to the new element to be inserted to the (linked) list, the Insert function receives three arguments: list, new_pointer, and black-list. In this example, the Insert function is declared as:

void Insert (list, new_pointer, black_list); The list and black list have been previously introduced and are regarded similarly in the context of this function. The return value 'void' indicates that the function returns nothing (a function can alternatively return a Boolean expression, a pointer or any other type). Once invoked with the three arguments, the Insert function begins, at 402, by setting i=0 and n=(INT)new_pointer, where 'i' is the index to the i-th slot in the black list, and 'n' is an integer value of the new_pointer. Again, the conversion of the pointer to integer is semantic to avoid compiler error messages when pointers are compared to integer values (i.e., comparisons of two distinct types).

Next, the black list is traversed, using i as the index, where each slot in the black list is compared against 'n' (which now contains the integer value of new_pointer) 404, 408 and 410. If 'n' is found in any of the slots in the black list, it means that the same element is in the process of being deleted and, as a result, the 'n' needs to be slightly modified 406. One way to modify the 'n' is to increment it by one (i.e. change the least significant bit to '1'). For the modified value of 'n' the search through the black list starts anew at 402. The foregoing can be implemented in program instructions as follows:

```
Retry:
n = new_pointer;
for (i=0; i<N; i++)    /* while i is less than N increment i */
{                      /* N is size of black list to be traversed */
    if (black-list[i] = = n)
    {
        ++n;
        if (n & LEAST_SIGNIFICANT_BITS == 0) n = new_pointer;
        goto Retry;
    }
do
{
```

```
        next = *list;       /*pointer to front of linked list before
                               insertion to next */
        new_pointer→next = next;    /*next element in new_pointer
                                      structure */
    }
    While (!CAS ((INT *)list, (INT)next, (INT)n));
}
```

In the 'for' loop, the i-th slot in the black list is examined to determine if it contains n, and, if so, it means that the element pointed to by 'n' is in the process of being removed (e.g., via the foregoing Remove function) 404 and 408. Therefore 'n' is incremented (as in "n++") in order to introduce the 'noise' to 'n' so as to differentiate it from the n (pointer value) associated with element currently being removed 406. If the 'for' loop traverses the N slots of the black list without finding n, the 'for' loop ends 410.

In the above, we need to ensure that ++n cannot change the significant part of the pointer, This will normally impose a size limit on N to ensure that this cannot happen unless the black list changes in the meantime. We have also added an overflow check to deal with the case in which another thread concurrently changes the black list.

Next, in the 'do' loop the instructions are performed at least once and possibly more times if the condition of 'NOT TRUE' persists 412 and 414. The "!" operator is a negation operator as in "! CAS( . . . )" where the negation of TRUE is NOT TRUE or FALSE.

Specifically, if in the interim, after next=*list and before the CAS operation, another intervening thread changes the first pointer value so that it is no longer equal to 'next', the CAS operation will fail and return FALSE; and the foregoing 'do' loop will be repeated 414. Conversely, if the shared value (INT *)list is equal to the old value (INT)next, the CAS operation succeeds in that the value in (INT *)list can be replaced by new_pointer and the CAS returns TRUE. This concludes the insertion of the element at the front of the linked list.

We can now refer back to FIG. 2B to see the results of element insertion, e.g., via the Insert function. As shown, *list, which is effectively the 'first_ptr' pointer now has the value of new_pointer and it points to the newly-inserted first element of the linked list (i.e., the node at the front of the linked list).

In summary, the present invention can be used to implement various shared data structures, including a stack, accessible from multiple concurrent threads, without the adverse effects of the A-B-A problem. And, although the present invention has been described in considerable detail with reference to certain preferred versions thereof, other versions are possible. Therefore, the spirit and scope of the appended claims should not be limited to the description of the preferred versions contained herein.

What is claimed:

1. A method for implementing, in a multithreaded environment, an almost non-blocking linked list, comprising:
   providing a black list associated with a linked list, the black list for holding pointer values each being associated with a node that is in the process of being removed from the linked list, wherein the linked list is lock-free as long as the black list is not full and is blocking when the black list is overflowing so as to implement the linked list as an almost non-blocking linked list;
   modifying the pointer value for each node being inserted to the linked list, using a predetermined variation in the pointer value associated with such node to prevent blocking the insertion of such node when its associated pointer value is present in the black list, whereby this predetermined variation facilitates distinguishing the pointer value in the black list from its modified value; and
   upon also finding the modified value in the black list, repeating the modifying step until, lastly, the modified value is no longer found in the black list.

2. A method for implementing, in a multithreaded environment, an almost non-blocking linked list, comprising:
   providing a first pointer associated with a linked list, the first pointer pointing to the front of the linked list;
   providing a black list associated with the linked list and containing one or more slots, each slot for holding a value associated with a node that is in the process of being removed from the linked list;
   modifying the value associated with a node if a thread attempts insertion of the node to the linked list but the value is found in the black list, the value being held in the black list for as long as removal of the node is ongoing, wherein the first pointer receives the value only if it is not in the black list, otherwise the first pointer receives the modified value provided, however, that the modified value is also not found in the black list;
   upon also finding the modified value in the black list, repeating the modifying step until, lastly, the modified value is no longer found in the black list; and
   using a compare-and-swap (CAS) operation in each insertion, and removal, to determine if an intervening thread has modified the first pointer after a copy of the first pointer has been made but before it is to receive the value or modified value, whereby access to the linked list by multiple concurrent threads is almost non-blocking.

3. The method of claim 2, wherein access to the linked list is lock-free provided that the black list is not full when removal is attempted.

4. The method of claim 2, wherein the value associated with the node in the process of being removed is a pointer value of a pointer to the node.

5. The method as in claim 2, wherein each thread is a signal handler run in response to a user-level signal.

6. The method as in claim 2, wherein the black list is an array.

7. The method as in claim 2, wherein the linked list is a LTFO (last-in-first-out) and it is employed as a stack.

8. The method of claim 2, wherein the first pointer has a current pointer value, and wherein the CAS operation compares the copy against the first pointer and if they are equal it swaps the current pointer value with a new pointer value that points to a new first node in the linked list.

9. The method of claim 2, wherein during removal of the node the CAS operation is used in two instances, if in the first instance that CAS operation fails the corresponding black list slot remains occupied with another value otherwise it receives the value associated with the node, and if in the second instance the CAS operation fails the first pointer remains unchanged until, by being repeated, the CAS operation succeeds.

10. The method of claim 9, wherein, the CAS operation in the first instance is repeated after its failure until an empty slot is found which is ready to receive the value associated with the node.

11. The method of claim 2, wherein a single black list is associated with one of more than one linked list.

12. The method of claim 2, wherein the CAS operation is a single-word operation.

13. A computer system for implementing, in a multi-threaded environment, an almost non-blocking linked list, comprising:
   a processor;
   a memory the space in which is being allocated for computer program code, a first pointer, a linked list to which the first pointer is pointing, and a black list associated with the linked list and containing one or more slots, each slot for holding a value associated with a node that is in the process of being removed from the linked list, the program code having instructions that cause the processor to perform the steps of:
   providing a first pointer associated with a linked list, the first pointer pointing to the front of the linked list;
   providing a black list associated with the linked list and containing one or more slots, each slot for holding a value associated with a node that is in the process of being removed from the linked list;
   modifying the value associate with a node if a thread attempts insertion of the node to the linked list but the value is found in the black list, the value being held in the black list for as long as removal of the node is ongoing, wherein the first pointer receives the value only if it is not in the black list, otherwise the first pointer receives the modified value provided, however, that the modified value is also not found in the black list;
   upon also finding the modified value in the black list, repeating the modifying step until, lastly, the modified value is no longer found in the black list; and
   using a compare-and-swap (CAS) operation in each insertion, and removal, to determine if an intervening thread has modified the first pointer after a copy of the first pointer has been
   made but before it is to receive the value or modified value, whereby access to the linked list by multiple concurrent threads is almost non-blocking.

14. The computer system of claim 13, wherein access to the linked list is lock-free provided that the black list is not full when removal is attempted.

15. The computer system of claim 13, wherein the value associated with the node in the process of being removed is a pointer value of a pointer to the node.

16. The computer system of claim 13, wherein each thread is a signal handler run in response to a user-level signal.

17. The computer system of claim 13, wherein the black list is an array.

18. The computer system of claim 13, wherein the linked list is a LIFO (last-in-first-out) and it is employed as a stack.

19. The computer system of claim 13, wherein the first pointer has a current pointer value, and wherein the CAS operation compares the copy against the first pointer and if they are equal it swaps the current pointer value with a new pointer value that points to a new first node in the linked list.

20. The computer system of claim 13, wherein during removal of the node the CAS operation is used in two instances, if in the first instance that CAS operation fails the corresponding black list slot remains occupied with another value otherwise it receives the value associated with the node, and if in the second instance the CAS operation fails the first pointer remains unchanged until, by being repeated, the CAS operation succeeds.

21. The computer system of claim 20, wherein, the CAS operation in the first instance is repeated after its failure until an empty slot is found which is ready to receive the value associated with the node.

22. The computer system of claim 13, wherein a single black list is associated with one of more than one linked list.

23. The computer system of claim 13, wherein the CAS operation is a single-word operation.

24. A method for implementing, in a multithreaded environment, an almost non-blocking concurrently accessed data structure, the method comprising:
   providing a black list associated with a field, the black list identifying field values that might be in the process of being replaced, wherein the data structure is lock-free as long as the black list is not full and is blocking when the black list is overflowing so as to implement the data structure as an almost non-blocking concurrently accessed data structure;
   modifying a field value for each value being assigned to the field, using a predetermined variation in the field value to prevent blocking the assignment of a new field value when the intended new field value is present in the black list, whereby this predetermined variation facilitates distinguishing the field value in the black list from its modified value; and
   upon also finding the modified value in the black list, repeating the modifying step until, the modified field value is no longer found in the black list.

* * * * *

UNITED STATES PATENT AND TRADEMARK OFFICE
CERTIFICATE OF CORRECTION

PATENT NO. : 7,451,146 B2
APPLICATION NO. : 10/883118
DATED : November 11, 2008
INVENTOR(S) : Hans-Juergen K. H. Boehm It is certified that error appears in the above-identified patent and that said Letters Patent is hereby corrected as shown below:

In column 6, line 12, delete "$first_{13}$ ptr" and insert -- first_ptr --, therefor.

In column 12, line 46, in Claim 7, delete "LTFO" and insert -- LIFO --, therefor.

In column 12, line 65, in Claim 11, delete "of" and insert -- or --, therefor.

In column 13, line 19, in Claim 13, delete "associate" and insert -- associated --, therefor.

In column 14, line 21, in Claim 22, delete "of" and insert -- or --, therefor.

Signed and Sealed this

Seventh Day of April, 2009

JOHN DOLL
*Acting Director of the United States Patent and Trademark Office*